Nov. 29, 1938.   W. E. SWARTZWELDER   2,138,714
VALVE
Filed Jan. 12, 1937   2 Sheets-Sheet 1
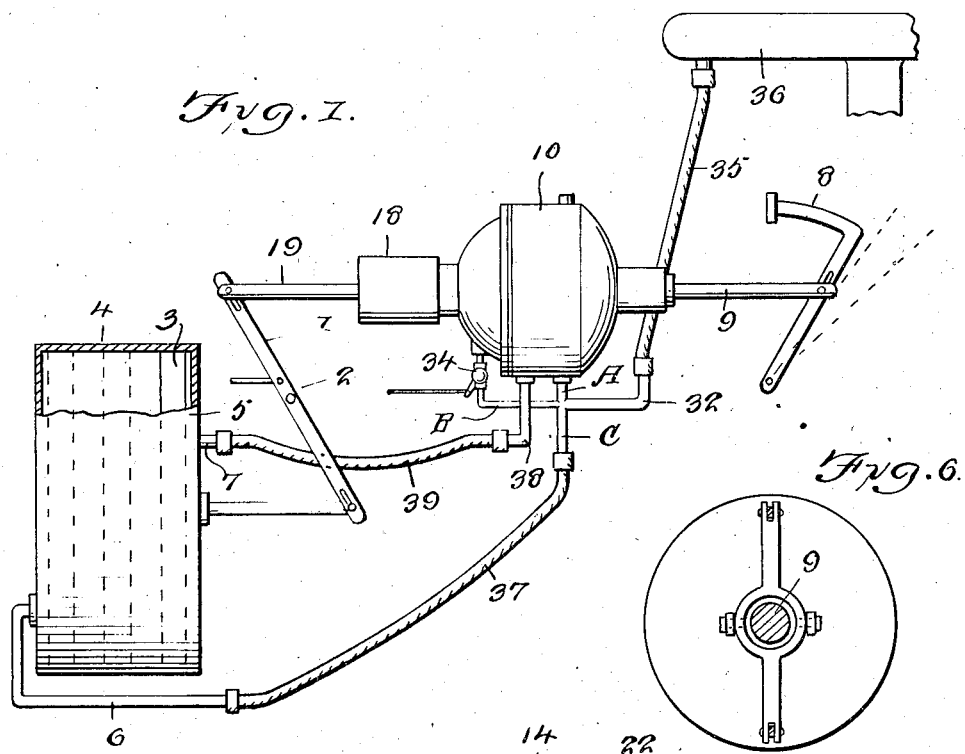
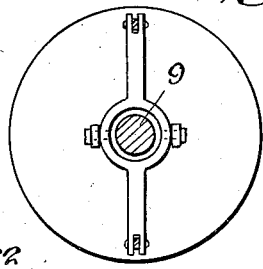
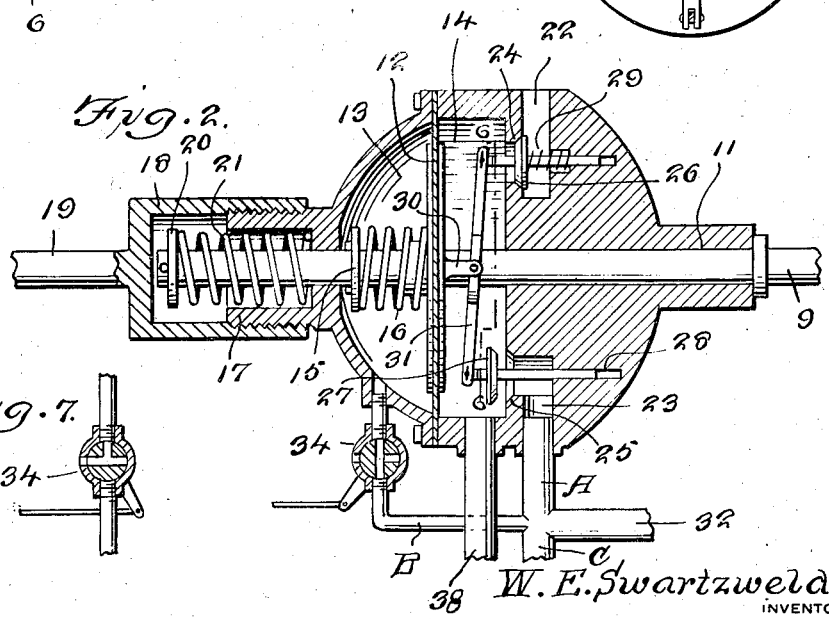
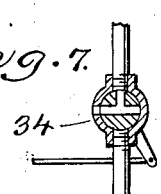
W. E. Swartzwelder
INVENTOR
BY Victor J. Evans & Co.
ATTORNEY

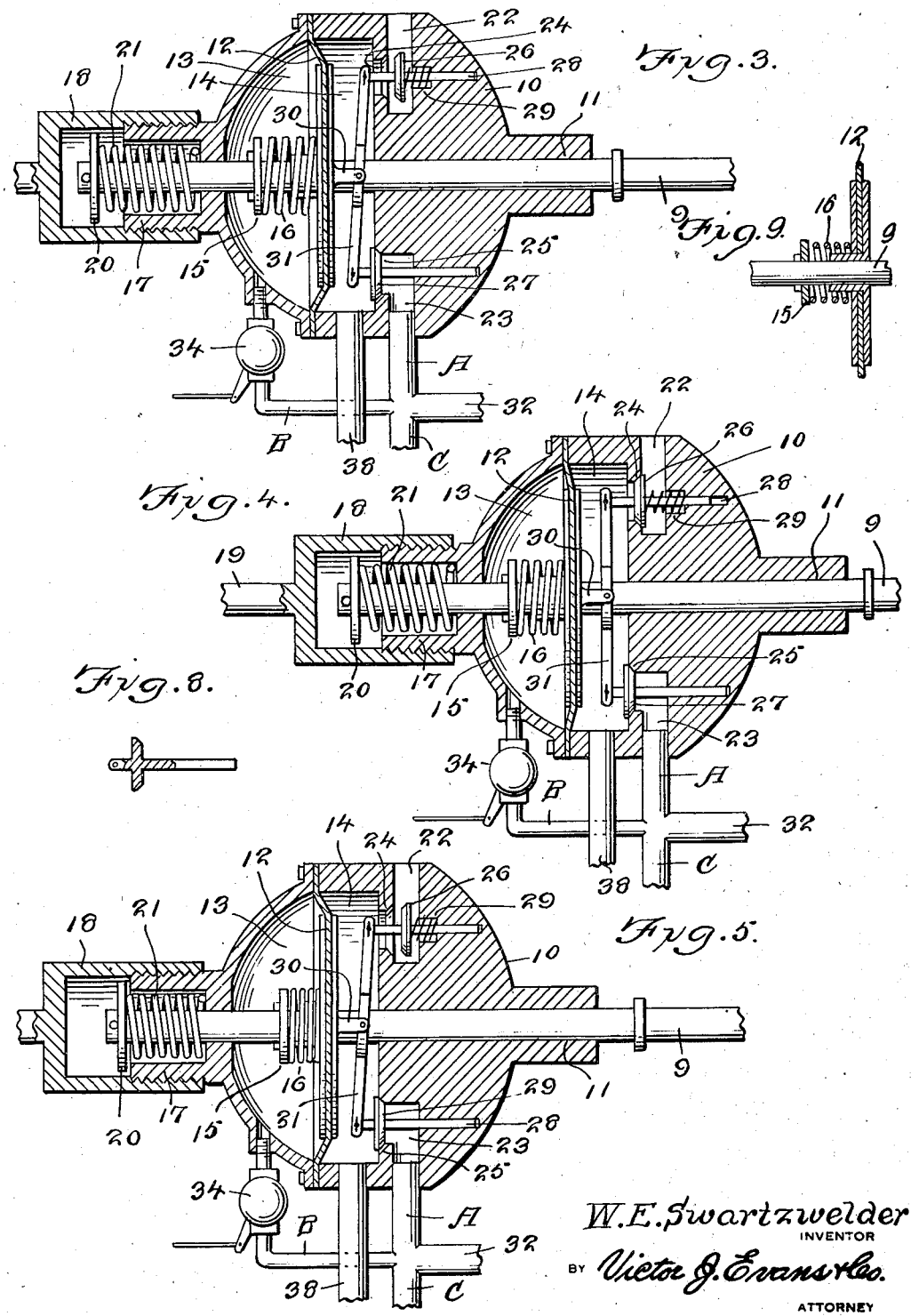

Patented Nov. 29, 1938

2,138,714

UNITED STATES PATENT OFFICE 2,138,714

VALVE

William E. Swartzwelder, Cumberland, Md.

Application January 12, 1937, Serial No. 120,295

6 Claims. (Cl. 188—152)

This invention relates to valves for vacuum operated brakes of motor vehicles and has for the primary object the provision of a simple and inexpensive device of this character which may be readily substituted for the control valve now in use on a vacuum operated brake and which will prevent wheel locking or sudden brake application during the initial movement of the brake pedal towards brake applying position and thereby eliminate skidding and accidents incident thereto and will bring about full braking action of the brakes when the brake pedal has been moved a substantial distance or into full brake applying position and also will permit application of the brakes to be made directly by the foot pedal should the vacuum part of the brake system become defective and fail to operate.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary diagrammatical view showing a vacuum operated brake system with a control valve adapted thereto and constructed in accordance with my invention.

Figure 2 is a vertical sectional view illustrating the valve with the valve elements thereof occupying positions when the brakes are in neutral or non-braking position.

Figure 3 is a view similar to Figure 2 showing the position occupied by the valve elements during the initial or part movement of the brake pedal towards brake applying position.

Figure 4 is a view similar to Figures 2 and 3 showing the valve elements occupying their positions when the brake pedal has completed its initial position and the brakes partly applied.

Figure 5 is a view similar to Figures 2, 3 and 4 showing the position of the valve elements when the brakes are in full brake applying position.

Figure 6 is a detail sectional view taken on the line 6—6 of Figure 2.

Figure 7 is a fragmentary sectional view showing a vacuum relief valve employed for retaining the brakes in set or brake applying position.

Figure 8 is a detail sectional view showing one of the valve elements.

Figure 9 is a detail sectional view showing a brake pedal rod passing through the diaphragm.

Referring in detail to the drawings, the numeral 1 indicates a part of a brake rigging of a motor vehicle including a pivotally mounted lever 2 to which is connected the piston 3 of a vacuum operated brake booster 4, consisting of a cylinder 5 in which the piston 3 is located and has connected to opposite ends thereof pipes 6 and 7.

The numeral 8 indicates a brake pedal connected by a pin and slot connection to a rod 9. The rod 9 forms a part of the present invention.

A housing 10 of sectional formation has a bore 11 to slidably receive the rod 9. Located in the housing is a diaphragm 12 forming therein vacuum chambers 13 and 14. The diaphragm has an opening, the walls of which have a comparatively tight fit with the rod 9. However, the rod 9 is free to slide without affecting the position of the diaphragm. A spring seat 15 is secured to the rod 9 and is located in the vacuum chamber 13. A coil spring 16 surrounds the rod 9 with one end engaging the seat 15 and the other end engaging the diaphragm and which provides a yieldable drive between the rod 9 and the diaphragm.

An external threaded boss 17 is formed on the housing 1 exteriorly thereof and receives the rod 9. A coupler 18 is threaded on the boss 17 and forms a part of a rod 19 which has a pin and slot connection with one end of the brake lever 2. A spring seat 20 is secured to the rod 9 within the coupler 18 and one end of a coil spring 21 bears thereagainst and the other end of the spring seats against the housing 10 within the boss 17. The spring 21 compresses by the rod 9 moving with the brake pedal towards brake applying position and offers sufficient resistance to the movement of the brake pedal 8 by the foot of the operator to assure smooth operation or movement of the brake pedal under foot pressure. The brake pedal 8, as shown in full line in Figure 1 is the position occupied by said foot pedal during the non-application of the brakes and the spring 16 is substantially relaxed.

The housing 10 has formed therein passages 22 and 23 both of which communicate with the vacuum chamber 14. Valve seats 24 and 25 are arranged between the passages 22 and 23 and the chamber 14. Valve elements 26 and 27 operate in conjunction with the valve seats 24 and 25, the stems of which slide in guides 28 formed in the housing 10. A comparatively light coil spring 29 acts on the valve element 26 to engage the latter with the seat 24.

A bracket 30 is secured to the diaphragm 12 and pivotally supports a lever 31. The lever is pivoted intermediate its ends to the bracket 30 and one end of said lever has a pin and slot connection with the valve element 26 and the other end of the lever has a pin and slot connection with the valve element 27. One end of the passage 22 opens to the atmosphere. A pipe 32 has branches A, B and C and the branch A is connected to the passage 23, while the branch B is connected to the vacuum chamber 13 and has located therein a valve 34 of the twoway type, that is, the valve may be positioned to close the branch B to the vacuum chamber 13 and at the same time vent the chamber 13 to the atmosphere or may be positioned to communicate the branch B with the vacuum chamber 13. A flexible pipe 35 connects the pipe 32 to an intake manifold 36 of the engine of the motor vehicle so that a constant vacuum is maintained in the pipe 32 while the engine is operating. While I have described and shown the pipe 32 as being connected to the intake manifold of an engine for the purpose of establishing a vacuum in the pipe 32 the latter may be connected to some other vacuum source. The branch C of the pipe 32 is connected to the pipe 6 by a flexible pipe 37. Connected with the vacuum chamber 14 is a pipe 38 and the latter is connected to the pipe 7 by a flexible pipe 39. During normal operation of the brakes by my invention, the valve 34 is positioned to communicate the branch B with the vacuum chamber 13 so that as long as there is a vacuum in the pipe 32 a vacuum will be had in the vacuum chamber 13, thereby establishing what may be termed a constant vacuum in the vacuum chamber 13. The valve 34 is controlled from the driver's seat of the motor vehicle and is permitted to remain in the position last referred to until the driver desires to leave the motor vehicle with the brakes in applied position. To accomplish this, the valve is adjusted to close the branch B to the vacuum chamber 13 and open the latter to the atmosphere.

The piston 3 moves to the left in Figure 1 to apply the brakes and to the right to release the brakes and occupies a position at the right end of the cylinder when the brakes are non-applied.

During the non-application of the brakes the pedal 8 occupies a full line position in Figure 1, the diaphragm as shown in Figure 2 with the valve element 27 unseated and the valve element 26 seated. The valve elements thus positioned permits vacuum to be developed in the chambers 13 and 14 and the vacuum remains constant in the chamber 13 either during the application or non-application of the brakes by said chamber 13 being in direct communication with the branch B of the pipe 32. The initial movement of the brake pedal 8 towards brake applying position causes a sliding movement of the rod 9 tensioning the spring 16 and the latter places pressure on the diaphragm 12 flexing the latter and thereby causing the valve 26 to become unseated and the valve 27 to become seated, as shown in Fig. 3. The valve 26 becoming unseated opens the vacuum chamber 14 to the atmosphere for a limited time and as soon as the brake pedal 8 stops its movement towards brake applying position, the valve 26 seats due to increase of atmospheric pressure in chamber 14, closing the vacuum chamber 14 to the atmosphere. Thus, the vacuum in the vacuum chamber 14 has been reduced to some extent. The reducing of the vacuum in the chamber 14 reduces the vacuum at one side of the piston 3 permitting the same to move a limited distance to the left in Figure 1 and thereby bring about a partial application of the brakes. This partial application of the brakes slows down the vehicle without brake grabbing or brake locking. However, if further or increased braking action is desired the brake pedal 8 is depressed further and the valve 26 again unseats further reducing the vacuum in the vacuum chamber 14 and the vacuum at one side of the piston 3, thus bringing about further application of the brakes. During the application of the brakes the valve 27 remains closed and is aided in maintaining its seated position by the vacuum in the passage 23 from the branch A.

On a full or complete depression of the brake pedal 8 to bring about full or complete brake action, the valve element 26 opens and remains open, as shown in Figure 5, depleting the vacuum in the vacuum chamber 14, consequently permitting the piston 3 to move to its fullest extent in the direction of the left in Figure 1. When the brakes have been fully applied, the spring 16 is substantially fully compressed, as shown in Figure 5. Should the vacuum mechanism fail from some cause, the brakes can be applied mechanically by fully depressing the brake pedal 8 causing the rod 9 to slide relative to the housing 1 until the spring seat 20 abuts the boss 17 which brings about a movement of the housing with the rod 9 and the housing being connected to the brake lever 2 rocks the same on its pivot and applies the brake mechanism. When the brakes are applied through my invention and the valves occupy the position as shown in Figure 5 with the spring 16 substantially compressed and it is desired to release the brakes, the brake pedal 8 is allowed to move towards non-brake applying position releasing the pressure on the spring 16 and the latter bearing against the diaphragm and the seat 15 of the rod 9 repositions the diaphragm, as shown in Figure 2, which unseats the valve 27 and seats the valve 26 so that vacuum is again restored in the vacuum chamber 14. As soon as the vacuum is equal in the chamber 13 and 14, the piston 3 may return to neutral or normal position by the brakes releasing. It is to be understood that the brakes always release by spring action when the fluid pressure employed for the application of said brakes is removed. When the diaphragm 12 is flexed during the movement of the brake pedal 8 towards brake applying position it, as before stated, seats the valve element 27 and unseats the valve element 26 admitting atmospheric pressure to the chamber 14 to act on the piston 3 to apply the brakes. Also, this atmospheric pressure influences the diaphragm 12 to flex the same in an opposite direction aided by the vacuum in the chamber 13, bringing about a further compressing of the spring 16 also permitting the spring 29 to seat the valve element 26 cutting off the chamber 14 to the atmosphere. It will, therefore, be seen that the brakes are partially applied and that the diaphragm 12 is substantially restored to normal position so that when the brake rod 9 is moved again by further movement of the brake pedal 8 towards brake applying position the diaphragm will be again flexed to unseat the valve element 26 and further lower the vacuum in the chamber 14 and bring about complete application of the brakes. This state of operation and the position of the valve elements is clearly shown in Figure 5. The diaphragm is held flexed by the position of the rod 9 due to the brake pedal 8 being in full brake applying position. Should it be desired to manually release the foot pedal 8 and still maintain the brakes applied, the valve 34 is operated to close the branch B to the chamber 13 and simultaneously vent the chamber 13 to the atmosphere. Atmospheric pressure then becomes equal in the chambers 13 and 14 which maintains the diaphragm in substantially the position shown in Figure 4 or 5 and the brakes in a set or holding position. The valve elements consequently remain as shown in Figure 4 with the atmospheric pressure acting on the piston 3 to retain the brakes applied. The use of the valve 34 is employed only when the driver of the vehicle desires to leave the vehicle with the brakes applied.

What is claimed is:

1. In combination with brakes of a motor vehicle including a brake rigging and a vacuum booster cylinder having a piston connected to the rigging and a vacuum source and a brake pedal for applying the brakes, a rod connected to said pedal, a housing slidably receiving said rod, means connecting said housing to the brake rigging, a diaphragm in said housing and forming vacuum chambers therein, means connecting the diaphragm to said rod, means connecting one of the chambers to the vacuum source for maintaining a constant vacuum therein, means connecting the other vacuum chamber to the booster cylinder at one side of the piston, means connecting the vacuum source to the booster cylinder at the other side of the piston, means connecting the last named vacuum chamber to the vacuum source and including a valve mechanism, a valve mechanism for opening and closing the last-named vacuum chamber to the atmosphere, and means connecting the valve mechanisms to the diaphragm.

2. In combination with brakes of a motor vehicle including a brake rigging and a vacuum booster cylinder having a piston connected to the rigging and a vacuum source and a brake pedal for applying the brakes, a rod connected to said pedal, a housing slidably receiving said rod, means connecting said housing to the brake rigging, a diaphragm in said housing and forming vacuum chambers therein, means connecting the diaphragm to said rod, means connecting one of the chambers to the vacuum source for maintaining a constant vacuum therein, means connecting the other vacuum chamber to the booster cylinder at one side of the piston, means connecting the vacuum source to the booster cylinder at the other side of the piston, means connecting the last named vacuum chamber to the vacuum source and including a valve mechanism, a valve mechanism for opening and closing the last named vacuum chamber to the atmosphere, and means connecting the valve mechanisms to each other and to the diaphragm.

3. In combination with brakes of a motor vehicle including a brake rigging and a vacuum booster cylinder having a piston connected to the rigging and a vacuum source and a brake pedal for applying the brakes, a rod connected to said pedal, a housing slidably receiving said rod, means connecting said housing to the brake rigging, a diaphragm in said housing and forming vacuum chambers therein, means connecting the diaphragm to said rod, means connecting one of the chambers to the vacuum source for maintaining a constant vacuum therein, means connecting the other vacuum chamber to the booster cylinder at one side of the piston, means connecting the vacuum source to the booster cylinder at the other side of the piston, means connecting the last named vacuum chamber to the vacuum source and including a valve mechanism, a valve mechanism for opening and closing the last named vacuum chamber to the atmosphere, and a lever connecting the valve mechanisms and pivoted on the diaphragm.

4. In combination with brakes of a motor vehicle including a brake rigging and a vacuum booster cylinder having a piston connected to the rigging and a vacuum source and a brake pedal for applying the brakes, a rod connected to said pedal, a housing slidably receiving the rod, means connecting said housing to the brake rigging, a diaphragm in said housing and forming vacuum chambers therein and slidable on said rod, means including a manually actuated control and vent valve connected to one of said chambers and to the vacuum source, means connecting the other vacuum chamber to the booster cylinder at one side of the piston, means connecting the vacuum source to the booster cylinder at the other side of the piston, means connecting the vacuum source to the last named vacuum chamber and including a valve mechanism, a valve mechanism for opening and closing the last named vacuum chamber to the atmosphere, a lever connecting the valve mechanisms and pivoted on the diaphragm, and a yieldable connection between the diaphragm and the rod.

5. In combination with brakes of a motor vehicle including a brake rigging and a vacuum booster cylinder having a piston connected to the rigging and a vacuum source and a brake pedal for applying the brakes, a rod connected to said pedal, a housing slidably receiving the rod, means connecting said housing to the brake rigging, a diaphragm in said housing and forming vacuum chambers therein and slidable on said rod, means including a manually actuated control and vent valve connected to one of said chambers and to the vacuum source, means connecting the other vacuum chamber to the booster cylinder at one side of the piston, means connecting the vacuum source to the booster cylinder at the other side of the piston, means connecting the vacuum source to the last-named vacuum chamber and including a valve mechanism, a valve mechanism for opening and closing the last named vacuum chamber to the atmosphere, a lever connecting the valve mechanisms and pivoted on the diaphragm, a spring seat secured on the rod, and a coil spring bearing against the diaphragm and the spring seat to provide a yieldable connection between the rod and the diaphragm.

6. In combination with brakes of a motor vehicle including a brake rigging and a vacuum booster cylinder having a piston connected to the rigging and a vacuum source and a brake pedal for applying the brakes, a rod connected to said pedal, a housing slidably receiving the rod, means connecting said housing to the brake rigging, a diaphragm in said housing and forming vacuum chambers therein and slidable on said rod, means including a manually actuated control and a vent valve connected to one of said chambers and to the vacuum source, means connecting the other vacuum chamber to the booster cylinder at one side of the piston, means connecting the vacuum source to the booster cylinder at the other side of the piston, means connecting the vacuum source to the last named vacuum chamber and including a valve mechanism, a valve mechanism for opening and closing the last named vacuum chamber to the atmosphere, a lever connecting the valve mechanisms and pivoted on the diaphragm, a spring seat secured on the rod, and a coil spring bearing against the diaphragm and the spring seat to provide a yieldable connection between the rod and the diaphragm, a second spring seat secured on the rod, and a coil spring interposed between the second seat and the housing, said second seat being capable of engaging the housing and thereby connecting the brake rod to said housing for the application of the brakes by the brake pedal should the vacuum from the vacuum source fail.

WILLIAM E. SWARTZWELDER.